United States Patent
Azami et al.

(10) Patent No.: US 6,847,744 B2
(45) Date of Patent: Jan. 25, 2005

(54) ALL-FIBER LINEAR DESIGN DEPOLARIZER

(75) Inventors: Nawfel Azami, Montreal (CA); François Gonthier, Montreal (CA); Alain Villeneuve, Montreal (CA); Eric Villeneuve, Montreal (CA)

(73) Assignees: ITF Technologies Optiques Inc., Montreal (CA); ITF Optical Technologies Inc.

( * ) Notice: Subject to any disclaimer, the term of this patent is extended or adjusted under 35 U.S.C. 154(b) by 0 days.

(21) Appl. No.: 10/397,672

(22) Filed: Mar. 27, 2003

(65) Prior Publication Data

US 2004/0008918 A1 Jan. 15, 2004

(30) Foreign Application Priority Data

Jul. 12, 2002 (CA) .............................................. 2393172

(51) Int. Cl.[7] .............................................. G02B 6/00
(52) U.S. Cl. .................. 385/11; 385/3; 385/9; 385/48; 385/14; 385/15
(58) Field of Search ............................. 385/11, 3, 9, 48, 385/14, 15

(56) References Cited

U.S. PATENT DOCUMENTS

| | | | | |
|---|---|---|---|---|
| 5,218,652 | A | * | 6/1993 | Lutz ............................. 385/11 |
| 6,334,005 | B1 | * | 12/2001 | Burie et al. ...................... 385/3 |
| 6,760,495 | B2 | * | 7/2004 | Gonthier et al. ............... 385/11 |
| 2002/0141698 | A1 | * | 10/2002 | Matsushita et al ............. 385/31 |
| 2003/0063833 | A1 | * | 4/2003 | Gonthier et al. ............... 385/11 |
| 2003/0063834 | A1 | * | 4/2003 | Godbout et al. ............... 385/11 |
| 2004/0101227 | A1 | * | 5/2004 | Takabayashi et al. ......... 385/11 |

FOREIGN PATENT DOCUMENTS

| | | |
|---|---|---|
| EP | 1164668 | 12/2001 |
| EP | 1241499 | 9/2002 |
| GB | 2254746 | 10/1992 |
| JP | 63113519 | 5/1999 |

OTHER PUBLICATIONS

Takada et al.; "New Fiber–Optic Depolarizer"; Journal of Lightwave Technology; 1986; pp 213–219; Vo. LT–4, No. 2; New York, US.

Ye A L et al.; "New Fabrication Technique for High Performance . . . "; Electronic Letters; Nov. 10, 1994; pp 1971–1972; vol. 20, No. 23; GB.

J. Noda, K. Okamoto and Y. Saski, J. Lightwave Technol. 4, 1071–1089 (1986) "Polarization–Maintaining Fibers and Their Appl.".

P. Shen and J.C. Palais, Opt. Fiber Technol. 3, 184–188 (1997) "New Single–Mode Fiber Polarization Scrambler".

P. Shen and J.C. Palais, Appl. Optics 3, 1686–1691 (1999) Passive Single–Mode Fiber Depolarizer.

* cited by examiner

Primary Examiner—Karl D. Frech
Assistant Examiner—Daniel Walsh
(74) Attorney, Agent, or Firm—George J. Primak

(57) ABSTRACT

An all-fiber depolarizer having a linear design includes a directional coupler associated with a polarization combiner. Linear light is pumped into the coupler where its intensity is split in two. Between the coupler and the combiner there is included an optical delay and the polarization of one intensity is made orthogonal to the other, as they enter the polarization combiner. The combiner combines the orthogonal polarizations and the light exits by an output in a depolarized state.

10 Claims, 2 Drawing Sheets

ALL-FIBER LINEAR DESIGN DEPOLARIZER

FIELD OF THE INVENTION

This invention relates to an all-fiber depolarizer enabling an optical signal polarization state to be changed from a strongly polarized state to an unpolarized or depolarized state. More particularly, it relates to a depolarizer having a linear design and based on an association of a directional coupler with a polarization combiner, such as a Mach-Zehnder interferometer.

BACKGROUND OF THE INVENTION

Optical depolarizers have found applications in two fields, the test and measurement as well as the design of Raman amplifiers. Different existing designs of fiber depolarizers have been documented. The most popular is the Lyot depolarizer, based on polarization maintaining fiber (PMF), such depolarizer is disclosed, for example, by J. Noda, K. Okamoto and Y. Sasaki, in J. Lightwave Technology 4, 1071–1089 (1986). However, for narrow-band sources this approach is not an option because of the long lengths of PMF required.

Polarization scrambling based on a directional coupler with a fiber ring structure and polarization controllers has also been described. This structure scrambles a well known input state of polarization (SOP) as disclosed, for example, by P. Shen and J. C. Palais, in Opt. Fiber Technology 3, 184–188(1997). The sensitivity to the input polarization fluctuation is a limiting factor to the stability of such depolarizer. A cascade of directional couplers allows an all SOP depolarizer, increasing the stability to the detriment, however, of insertion loss as disclosed, for example, by P. Shen and J. C. Palais, in Opt. 3, 1686–1691 (1999).

The present applicant has also described and claimed an all-fiber depolarizer in Canadian patent application No. 2,357,955 and U.S. patent application Ser. No. 10/045,190 which are incorporated herein by reference. In this depolarizer, a beam splitter having two input fibers and two output fibers is used and polarized light is controllably injected into one of the input fibers of the beam splitter, so that the polarization of the signal entering the beam splitter is at a 45° angle from the polarizing axis, and a loop is formed between the second input fiber and one of the output fibers of the beam splitter, said loop being made of a standard non-birefringent fiber and having a length greater than the coherence length of the light source. One of the embodiments disclosed in this prior patent application and illustrated in FIG. 3 thereof provides for a design based on a Mach-Zehnder interferometer structure (MZ) with a polarization maintaining fiber (PM) as a half wave plate on one of the MZ branches. A fiber ring delay line is also formed by the MZ by connecting one of the output ports to one of the input ports. The principle of operation is similar to the depolarizer based on a directional coupler and the Lyot depolariser.

The DOP of light of the MZ with a fiber ring delay line can be written as:

$$DOP = \left[1 - 4 \cdot \frac{\sum_{k=0}^{\infty}\sum_{j=0}^{\infty}(1 - g((k-j)\cdot\tau)\cdot Ix_k \cdot Iy_j)}{\sum_{m=0}^{\infty}(Ix_m + Iy_m)^2}\right]^{1/2}$$

where Ix and Iy are light intensities of X and Y polarizations, g is the Fourier transform of the normalized spectral shape of the source, k, j and m indicate the number of circulations in the fiber ring delay line and τ is the time delay between the two polarizations. The delay line structure works as a depolarizer for non-interferometric operation condition. In this condition each recirculating beam is noncoherent with the other beams. This is verified when the length of the fiber ring delay line is much longer than the coherence length of the light source. In this case:

$$g((k-j)\tau) = \begin{vmatrix} 1 & \text{if} & k = j \\ 0 & \text{if} & k \neq j \end{vmatrix}$$

The design described above works as a depolarizer if condition of equal power on the orthogonal states of polarization X/Y of the MZ-PM fiber is verified. Minimum DOP is achieved for an input azimuth of 45°. The DOP is dependant on the MZ loss and isolation as well as the circulating ring. In the ideal case double losses are induced for the X polarization. Like the fiber ring delay line with one directional coupler, this design is subject to DOP and loss variations when temperature varies. To avoid these fluctuations, the polarization must be maintained over its propagation without being affected by temperature.

The stability of the DOP is a key parameter for industrial applications. Thus, the input SOP must be carefully tuned to ensure a low DOP, and the splice quality between the device and the PM-output light source must be as high as possible (typically 30 dB of extinction ratio). In addition, the fluctuation of the SOP in the fiber ring must be maintained over all the environmental conditions specified. These conditions are difficult to meet in practice.

There is thus a need for an improved all-fiber depolarizer that would obviate the above problems.

SUMMARY OF THE INVENTION

The all-fiber depolarizer of the present invention for depolarizing a light source has a linear design and realizes a low DOP as well as minimizes its perturbations. It includes: a directional coupler, preferably a 3 dB wavelength and polarization independent coupler which splits in two the incoming light intensity; an optical delay arrangement, such as a loop which induces an optical delay between the polarizations propagating in one of the outputs of the directional coupler; a polarization controller, such as a small piece of PM fiber, making the polarizations orthogonal; and a polarization combiner, such as a Mach-Zehnder interferometer to which the orthogonal polarizations are input and where, in order to depolarize the light, the orthogonal polarizations are combined and then exit the combiner at one of its outputs as depolarized light. When the MZ is used as the polarization combiner, it is preferably a π-Phase interferometer.

In essence, therefore, the all-fiber linear design depolarizer of the present invention comprises:

(a) a polarization combiner adapted to combine orthogonal polarizations;

(b) a directional coupler having one or two input fibers, a coupling region and two output fibers, said coupler being adapted to split a signal pumped into the input fiber or fibers in two substantially equal intensities, and the output fibers of the coupler extend to become input branches to the polarization combiner;

(c) one of the branches between the coupler and the polarization combiner having a length different from that of the other branch and greater than the coherence length of the light source, thereby inducing an optical delay in the polarization propagating in said one of the branches; and (d) a polarization controller making the polarizations that enter the polarization combiner orthogonal, said polarizations being combined in the polarization combiner so as to depolarize the signal.

The polarization combiner can be any combiner of orthogonal polarizations, however, when a broadband operation is desired, the preferred combiner is a Mach-Zehnder interferometer with a short length of PM fiber in one of its branches, such as has been disclosed in applicant's prior patent applications mentioned above.

The directional coupler is preferably a wavelength independent and polarization independent coupler, such as a 3 dB coupler, that splits the signal pumped into the input fiber or fibers in two substantially equal intensities Ix and Iy.

The optical delay produced in one of the branches could be a loop in such branch or simply a different length of the branch that is greater than the coherence length of the light source.

The polarization controller can be any suitable controller that arranges orthogonally the two polarizations entering the polarization combiner. It is preferably a short piece of a PM fiber working as a half plate or other rotator of polarization or even a positioning of one of the branches so that one polarization is adjusted to be in an orthogonal position to the other.

In a preferred design, the DOP is given by the following equation:

$$DOP = \left[ 1 - 4 \cdot \frac{\sum_{k=1}^{2}\sum_{j=1}^{2}(1 - g(\tau) \cdot Ix_k \cdot Iy_j)}{\sum_{m=1}^{2}(Ix_m + Iy_m)^2} \right]^{1/2}$$

where
$Ix_1 = P_{wix} \cdot Iso \cdot |Xe|^2$   $Ix_2 = P_{wix} \cdot P_{MZ} \cdot |Xe|^2$
$Iy_1 = P_{wix} \cdot P_{MZ} \cdot |Ye|^2$ and $Iy_2 = P_{wix} \cdot Iso \cdot |Ye|^2$ Where Ix and Iy are light intensities of X and Y polarizations, and where $P_{wic}$ is the insertion loss of the wavelength insensitive 3 dB coupler and PMZ is the insertion loss and Iso, the isolation of the MZ, and $g(\tau)$ is the Fourier transform of the normalized spectral shape of the source, where $\tau$ is the time delay between the two polarizations.

The advantages of such novel design are:

A lower dependence on the input SOP compared to the one required when using a 2×2 directional coupler fiber ring delay line or a PM fiber because symmetric loss can be achieved for both polarizations with the linear design. Thus, the SOP input can be spliced at 0° with reference to the axis of the polarization combiner.

Low DOP of 5 to 10% over a wide spectral band.

Increased depolarizer stability due to the low polarization dependence.

Low DOP variation of the order of 1% and loss variation of the order of 0.1 dB for 0 to 70° C. temperature range.

In addition, the all silica-fiber structure allows depolarizing any laser with coherence length lower than the loop length and permits high power handling.

The novel linear design of the depolarizer of the present invention can be efficiently applied to Raman amplification which is based on stimulated Raman scattering, which is achieved by stimulating the transmission fiber with high power pumping. Multiple pump wavelengths are usually required for broad gain spectrum amplification. Optical depolarizers are necessary because of the polarization dependence of Raman gain (PDG). PMF or polarization pump combiner (PPC) are used in order to scramble the pump polarization, reducing the PDG.

The linear design of the depolarizer of the present invention allows combining and depolarizing two wavelengths independently chosen on a wide spectral band (e.g. 100 nm) and as such is well suited for Raman amplification. The advantages of the new design compared to PPC and PMF solutions are as follows:

The all silica-fiber ring allows depolarization of any laser with coherence length lower than the loop length, while in comparison, a given length of PMF is only optimized to depolarize a single laser coherence length.

The power insensitivity can be compared to the PPC, which requires a fine dynamic power control to assure a low DOP.

The absence of wavelength pump multiplexers allows a high degree of liberty for the spectral design. Any pair of wavelengths in the spectral band can be combined and depolarized.

DETAILED DESCRIPTION OF THE INVENTION

A preferred, but non-limitative embodiment of the invention will now be described with reference to the appended drawings, in which the same elements are identified by the same reference numbers.

Figure 1:
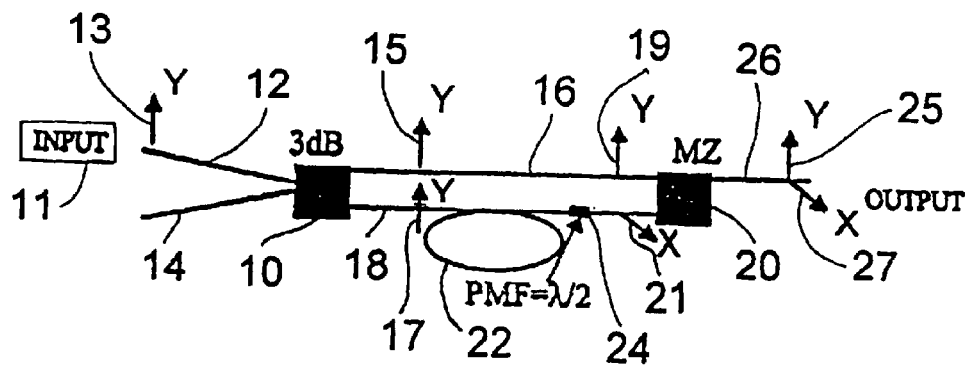
FIG. 1 is a graphical representation of the basic linear design of the all fiber depolarizer of the present invention.

FIG. 1 illustrates the basic embodiment of the present invention. The depolarizer shown in this figure comprises a 3 dB wavelength independent and polarization independent coupler 10 with two input fibers 12 and 14 and two output fibers 16 and 18 which form two branches that lead to a Mach-Zehnder interferometer 20. The block 11, marked "INPUT" includes a laser light source and means for pumping linear polarized light having polarization Y shown by arrow 13 into the input fiber 12 of the coupler 10, which splits its intensity in two, on the output branches 16 and 18, as shown by arrows 15 and 17 which continue to have polarization Y. One of the branches (18 in this case) has a loop 22 of a length that exceeds the coherence length of the laser that pumps linear polarized light into the input fiber 12 as shown by arrow 13. This loop 22 induces an optical delay to the light propagating in branch 18. Following the loop, a small piece 24 of PM fiber is used in branch 18 to work as a half wave plate, namely λ/2, making the polarizations to the input to MZ 20 orthogonal as shown by arrows 19 and 21, namely Y and X. The MZ used is a π phase interferometer which combines the orthogonal polarizations Y and X to depolarize the light at the MZ output 26 as shown by arrows 25 and 27.

Figure 2:
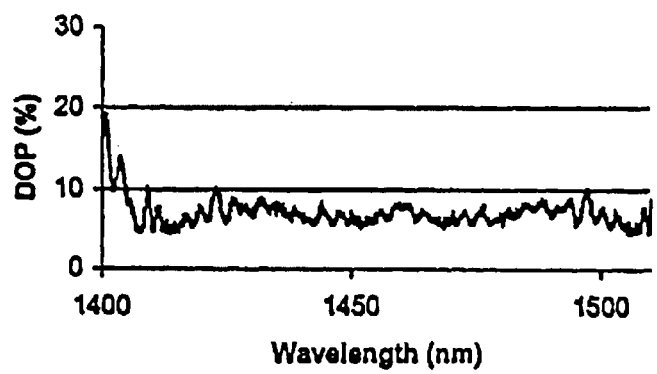
FIG. 2 is a graph showing the DOP over 100 nm spectral band, produced by the depolarizer of the present invention.

FIG. 2 shows a DOP in the range of 5% to 10% obtained with the depolarizer of FIG. 1 over a 100 nm spectral band, which represents a significant improvement over known depolarizers.

Figure 3:
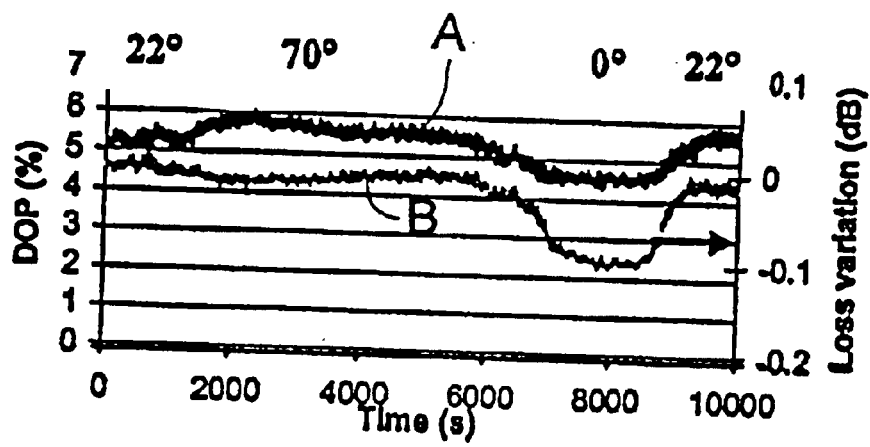
FIG. 3 is a graph showing the DOP variation and loss variation produced by the depolarizer of the present invention.

FIG. 3 shows as curve A the DOP variation, which is only about 1% for a 70° C. temperature range, and as curve B the loss variation which is only about 0.1 dB for the same temperature range.

Figure 4:
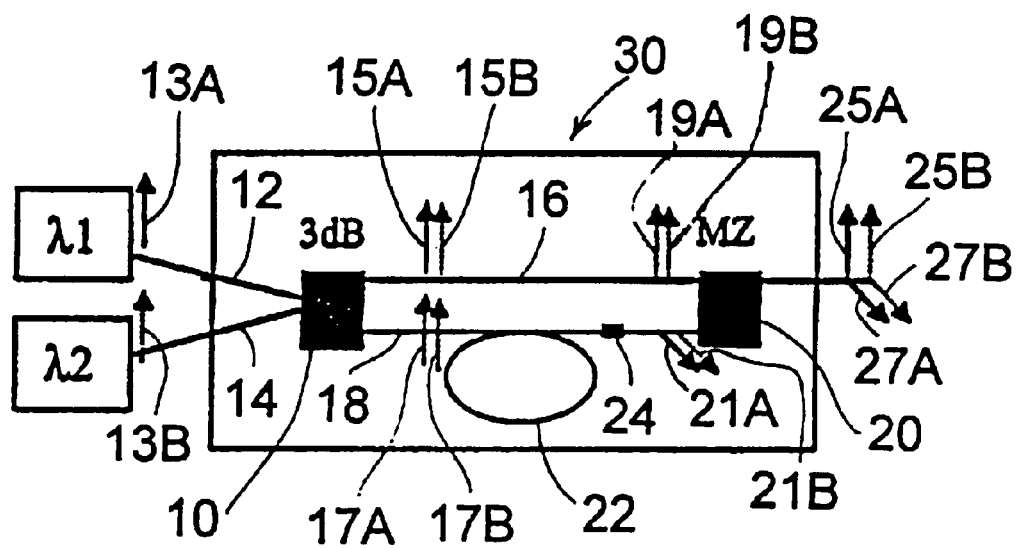
FIG. 4 is a schematic representation of a two wavelength Raman module using the depolarizer of the present invention.

Finally, FIG. 4 illustrates a two wavelengths Raman module 30, using the depolarizer of FIG. 1, in which two linear beams of light having wavelengths λ1 and λ2 are pumped into the input fibers 12 and 14 respectively, leading to the 3 dB coupler 10, as shown by arrows 13A and 13B. The 3 dB coupler splits the intensity of each of the incoming light beams in two, as shown by arrows 15A, 15B and 17A, 17B and the split intensities 17A, 17B propagate via branch 18 through the loop 22 which has a length greater than the coherence length of the laser that pumps beams 13A, 13B. Thereafter, they pass through the piece of PM fiber 24 working as a half wave plate to form orthogonal polarizations as shown by arrows 19A, 19B and 21A, 21B which enter the MZ 20 where the light intensities with different wavelengths are combined and come out at the output 26 as depolarized light as shown by arrows 25A, 25B and 27A, 27B. Any pair of wavelengths in a given band can thus be combined and depolarized by means of such Raman module.

The all-fiber linear design depolarizer of the present invention, which can also be efficiently applied to Raman amplification, presents the following important advantages.

Depolarization of a long coherence length laser.

Depolarization of a continuous range of coherence lengths.

Insensitivity of power, wavelength (over 100 nm) and coherence length of the source with low loss.

Depolarizing and combining functionalities.

The invention is not limited to the specific embodiments described and illustrated herein, but includes various modifications obvious to those skilled in the art as set out in the following claims.

What is claimed is:

1. An all-fiber linear design depolarizer for depolarizing a light source, which comprises:
   (a) a polarization combiner adapted to combine orthogonal polarizations;
   (b) a directional coupler having one or two input fibers, a coupling region and two output fibers, said coupler being adapted to split a signal pumped into the input fiber or fibers in two substantially equal intensities, and the output fibers of the coupler extend to become input branches to the polarization combiner;
   (c) one of the branches between the coupler and the polarization combiner having a length different than that of the other branch and greater than the coherence length of the light source, thereby inducing an optical delay in the polarization propagating in said one of the branches; and
   (d) a polarization controller making the polarizations that enter the polarization combiner orthogonal, said polarizations being combined in said polarization combiner so as to depolarize the signal.

2. A depolarizer according to claim 1, in which the polarization combiner is a Mach-Zehnder interferometer.

3. A depolarizer according to claim 2, in which the Mach-Zehnder interferometer is a π-phase interferometer.

4. A depolarizer according to claim 1, in which the coupler is a wavelength independent and polarization independent coupler.

5. A depolarizer according to claim 4, in which the coupler is a 3 dB coupler.

6. A depolarizer according to claim 1, in which the signal pumped into the input fiber or fibers is linear polarized light spliced essentially at an angle of 0° with reference to the axis of the polarization combiner.

7. A depolarizer according to claim 1, in which the light source is a long coherence length laser.

8. A depolarizer according to claim 1, in which the different length of said one of the branches is achieved by providing a loop therein.

9. A depolarizer according to claim 8, in which the loop is formed of a standard non-PM fiber.

10. A depolarizer according to claim 1, in which the light source pumps light of a different wavelength into each input fiber of the coupler that has two input fibers, thereby forming a two wavelength Raman module.

* * * * *